United States Patent
Nambata et al.

(10) Patent No.: US 11,874,134 B2
(45) Date of Patent: Jan. 16, 2024

(54) MAP INFORMATION-PROVIDING SYSTEM, MAP INFORMATION-PROVIDING METHOD, AND MAP INFORMATION-PROVIDING PROGRAM

(71) Applicant: PIONEER CORPORATION, Tokyo (JP)

(72) Inventors: Ippei Nambata, Saitama (JP); Reiji Matsumoto, Saitama (JP); Tetsuya Takahashi, Saitama (JP); Katsumi Amano, Saitama (JP); Takashi Aoki, Saitama (JP); Kazuki Oyama, Saitama (JP); Yuuki Matsumoto, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 485 days.

(21) Appl. No.: 16/959,978

(22) PCT Filed: Dec. 27, 2018

(86) PCT No.: PCT/JP2018/048227
§ 371 (c)(1),
(2) Date: Jul. 2, 2020

(87) PCT Pub. No.: WO2019/135395
PCT Pub. Date: Jul. 11, 2019

(65) Prior Publication Data
US 2020/0363232 A1   Nov. 19, 2020

(30) Foreign Application Priority Data
Jan. 4, 2018   (JP) ................. 2018-000172

(51) Int. Cl.
*G01C 21/00*   (2006.01)
*G01C 21/34*   (2006.01)
(Continued)

(52) U.S. Cl.
CPC ......... *G01C 21/3815* (2020.08); *G01C 21/34* (2013.01); *G01C 21/3859* (2020.08);
(Continued)

(58) Field of Classification Search
CPC ............. G01C 21/3815; G01C 21/34; G01C 21/3859; G01C 21/3667; G01C 21/387;
(Continued)

(56) References Cited

U.S. PATENT DOCUMENTS

2016/0273925 A1* 9/2016 Maekawa .............. G01C 21/30
2018/0032086 A1* 2/2018 Punithan .............. G05D 1/0027
(Continued)

FOREIGN PATENT DOCUMENTS

JP   2011047662 A      3/2011
JP   2017007572 A  *   1/2017
(Continued)

OTHER PUBLICATIONS

Extended European Search Report dated Aug. 6, 2021 from counterpart EP Patent Application No. 18898594.9, 31 pages.
(Continued)

*Primary Examiner* — Nga X Nguyen
(74) *Attorney, Agent, or Firm* — Procopio, Cory, Hargreaves & Savitch LLP (57) ABSTRACT

A map information-providing system, a map information-providing method, and a map information-providing program which can provide map information while suppressing incongruity a recipient feels are provided. A navigation system (map information-providing system) includes a storage unit storing map information for navigation (first map information) and map information for autonomous driving (second map information) an updating period thereof is different from the map information for navigation with respect to at least a portion of a period of time, and a map
(Continued)

information-providing unit which provides map information by combining the map information for navigation with the map information for autonomous driving in a case where the map information for autonomous driving had been updated based on newer information than the map information for navigation at a time of providing the map information.

4 Claims, 7 Drawing Sheets

(51) Int. Cl.
     *G09B 29/00*        (2006.01)
     *G05D 1/02*         (2020.01)
     *G05D 1/00*         (2006.01)

(52) U.S. Cl.
     CPC ......... *G05D 1/0274* (2013.01); *G09B 29/003* (2013.01); *G05D 1/0088* (2013.01); *G05D 2201/0213* (2013.01)

(58) Field of Classification Search
     CPC ............... G05D 1/0274; G05D 1/0088; G05D 2201/0213; G09B 29/003; G09B 29/106
     See application file for complete search history.

(56) References Cited

U.S. PATENT DOCUMENTS

2018/0164120 A1*   6/2018   Aoyama .......... G08G 1/096822
2020/0363232 A1    11/2020   Nambata et al.

FOREIGN PATENT DOCUMENTS

JP       2017007572 A     1/2017
JP       2017173286 A     9/2017
JP       2017181390 A     10/2017

OTHER PUBLICATIONS

International Search Report and Written Opinion for related JP App. No. PCT/JP2018/048227 dated Apr. 2, 2019; 5 pages.
Japanese Patent Office, Notice of Reasons for Refusal, Application No. JP 2021-168572, dated Aug. 9, 2022, in 9 pages.

* cited by examiner

MAP INFORMATION-PROVIDING SYSTEM, MAP INFORMATION-PROVIDING METHOD, AND MAP INFORMATION-PROVIDING PROGRAM

TECHNICAL FIELD

This invention relates to a map information-providing system, a map information-providing method, and a map information-providing program which provide map information.

BACKGROUND ART

As an example of a map information-providing system, a navigation system which performs driving guidance such as route guidance to a destination or the like to a driver is conventionally known (for example, refer to Patent Document 1). Many of such navigation systems provide map information using map information for navigation stored in a storage unit inside, perform a search or the like for the most appropriate route to a destination, and perform route guidance or the like based on a result of the search.

Here, among navigation systems, there is a system which is connected to a network environment and appropriately receives update of map information for navigation from a server on the network. Accuracy of guidance can be increased since the navigation system can recognize newly built roads or the like by this update.

CITATION LIST

Patent Document

[Patent Document]: Japanese Unexamined Patent Application Publication No. 2017-173286

SUMMARY OF THE INVENTION

Technical Problem

Here, in the navigation system as mentioned above, update of map information for navigation is often performed setting an updating period of a fixed interval since it takes time and costs for an updating process. Therefore, the update of the map information for navigation tends to be performed in a long span of time, for example, every half year or the like. As a result, a present situation is that, depending on a timing at which driving guidance is performed, there is a possibility that incongruity is given to a driver since discrepancy is generated between map information provided by the navigation system and an actual road environment.

Meanwhile, up until here, the incongruity a recipient feels regarding the map information provided by the map information-providing system has been explained with a navigation system as an example. However, not limited to a navigation system, the incongruity like this can be generated in general in any systems which provide map information.

Therefore, an example of the problem to be solved by the present invention is to provide a map information-providing system, a map information-providing method, and a map information-providing program which can provide map information while suppressing the incongruity a recipient feels.

Solution to Problem

In order to solve the problem and to achieve the object aforementioned, a map information-providing system of the present invention described in claim 1 includes:

a storage unit storing first map information, and second map information updating period thereof is different from the first map information with respect to at least a portion of a period of time; and a map information-providing unit which provides map information by combining the second map information with the first map information in a case where the second map information has been updated based on newer information than the first map information at a time of providing the map information.

DESCRIPTION OF EMBODIMENT

An embodiment of the present invention will be described below. A map information-providing system according to the embodiment of the present invention includes a storage unit storing first map information, and second map information updating period thereof is different from the first map information with respect to at least a portion of a period of time. In addition, this map information-providing system includes a map information-providing unit which provides map information by combining the second map information with the first map information in a case where the second map information had been updated based on newer information than the first map information at a time of providing the map information.

In the map information-providing system in the present embodiment, the first map information and the second map information updating periods thereof are different from each other for at least a portion of a period of time are stored in a storage unit. In addition, the map information-providing unit provides map information by combining the second map information with the first map information in a case where the second map information had been updated based on the newer information than the first map information at a time of providing the map information. That is, even when discrepancy is generated between an actual road environment and the first map information, map information based on the second map information having higher consistency with the actual road environment compared to this first map information is provided. In addition to that, even when there are short of information in the second map information, the map information can be complemented using the second map information and provided. Thus, according to the map information-providing system of the present embodiment, map information can be provided while suppressing incongruity a recipient feels.

Here, in the map information-providing system of the present embodiment, the above-mentioned first map information is map information for navigation having image information for performing driving guidance to a driver of a vehicle. Further, the above-mentioned second map information is map information for autonomous driving having control information for autonomous driving of a vehicle.

Generally, by a nature of being used for autonomous driving, the map information for autonomous driving is demanded of high consistency with the actual road environment. Therefore, the map information for autonomous driving is updated in a shorter span compared to the map information for navigation which is updated in a long span as mentioned above. In the map information-providing system in the present embodiment, the map information-providing unit provides the map information by combining the map information for autonomous driving with the map information for navigation in a case where the map information for autonomous driving was updated based on newer information than the map information for navigation at a time of providing the map information. That is, even when discrepancy is generated between an actual road environment and the map information for navigation, map information based on the map information for autonomous driving which has higher consistency with the actual road environment is provided. In addition to that, various information which tends to be in shortage in the map information for autonomous driving which is not intended to be referred to by a driver is complemented using the map information for navigation which is intended to be referred to by a driver, and thereby the map information can be provided. Thus, according to the map information-providing system of the present embodiment, map information can be provided while suppressing incongruity the driver feels.

Further, in the map information-providing system of the present embodiment, the map information-providing unit includes a map display data-creating unit, a synthesizing unit, and a guidance unit. The map display data-creating unit creates display data for map for autonomous driving to visualize the control information in the map information for autonomous driving. The synthesizing unit combines a non-inclusion object which is not included in the display data for map for autonomous driving out of image objects in the map information for navigation, with this display data for map for autonomous driving. The guidance unit performs driving guidance according to a result of combining in the synthesizing unit.

Meanwhile, the display data for map for autonomous driving referred here means data to visualize the control information in the map information for autonomous driving in order to be visible to the driver, and does not mean that such data is used in autonomous driving. Autonomous driving is performed using the control information in the map information for autonomous driving.

As described above, in the map information for autonomous driving which is not intended to be referred to by a driver, there is a possibility that information regarding an image object such as, for example, a building in the vicinity of a road, is not included. According to the map information-providing system of the present embodiment, such a non-inclusion object is extracted from the image objects in the map information for navigation. Then, the non-inclusion object is combined with the display data for map for autonomous driving. Consequently, map information can be provided in a form of driving guidance while further suppressing incongruity the driver feels.

Further, in the map information-providing system of the present embodiment, in a case where the above-mentioned non-inclusion object interferes or is arranged in the vicinity of the image object constituting the display data for map for autonomous driving, the synthesizing unit performs a following process. That is, in such a case, the synthesizing unit finishes combining without using the non-inclusion object, or combines the non-inclusion object with differentiating it from the image object constituting the display data for map for autonomous driving.

Since the above-mentioned non-inclusion object is based on the map information for navigation, there is a possibility that the non-inclusion object is old compared to the display data for map for autonomous driving. Therefore, in a case where the non-inclusion object is combined with the display data for map for autonomous driving, there is a case where the non-inclusion object interferes or is arranged in the vicinity of the image object of the display data for map for autonomous driving. In the map information-providing system of the present embodiment, in such a case, the synthesizing unit finishes combining without using the non-inclusion object, or combines the non-inclusion object with differentiating it from the image object constituting the display data for map for autonomous driving. When combining is finished without using the non-inclusion object, visual incongruity can be suppressed in the display data for map for autonomous driving. Further, when the non-inclusion object is combined with differentiating it from the image object of the display data for map for autonomous driving, the visual incongruity caused by interference or being arranged in the vicinity can be suppressed, and moreover, it is possible to notify the driver there is a possibility that the non-inclusion object is different from an actual state. Thus, according to the map information-providing system of the present embodiment, driving guidance can be performed while further suppressing incongruity the driver feels.

Further, the map information-providing method according to the embodiment of the present invention includes an update judging step and a map information-providing step. The update judging step is a step of judging whether the second map information an updating period thereof is different from the first map information for at least a portion of a period of time has been updated based on newer information than the first map information at the time of providing the map information or not. The map information-providing step is a step of providing the map information by combining the first map information with the second map information when it is judged that the second map information has been updated based on the newer information than the first map information.

In the map information-providing method in the present embodiment also, in a case where the second map information had been updated based on the newer information than the first map information at the time of providing map information, the map information is provided by combining the first map information with the second map information. Consequently, map information can be provided while suppressing incongruity a recipient feels.

Further, a map information-providing program according to the embodiment of the present invention causes the map information-providing method in the above-mentioned embodiment to be performed by a computer. Consequently, the above-mentioned map information-providing method is performed, and thus the map information can be provided while suppressing incongruity a recipient feels.

Meanwhile, "time of providing the map information" stated in the present embodiment means a time when the map information is shown to a recipient, for example, a driver of a vehicle or the like, who is to be provided with the map information by image display or the like.

EXAMPLE

An example of the present invention will be described specifically below with reference to the drawings.

Figure 1:
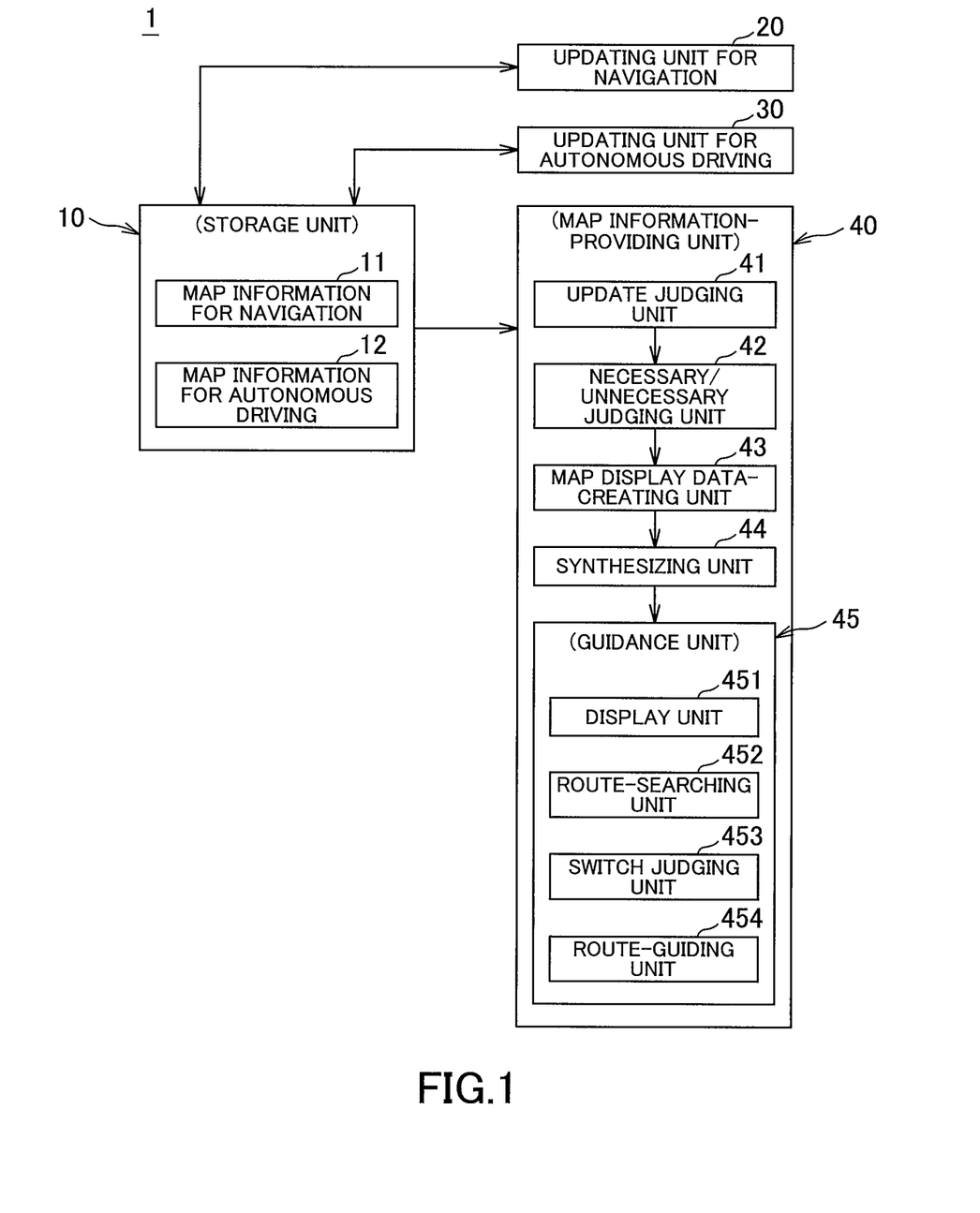
FIG. 1 is a schematic block diagram illustrating a navigation system according to an example of a map information-providing system of the present invention.

FIG. 1 is a schematic block diagram illustrating a navigation system according to an example of a map information-providing system of the present invention.

A navigation system 1 shown in FIG. 1 is mounted in a vehicle having an autonomous driving function and performs driving guidance to a driver, and includes a storage unit 10, an updating unit for navigation 20, an updating unit for autonomous driving 30, and a map information-providing unit 40.

The storage unit 10 stores map information for navigation 11 (first map information) and map information for autonomous driving 12 (second map information) updating periods thereof are different from each other for at least a portion of a period of time. The map information for navigation 11 includes image information for performing driving guidance to the driver of a vehicle. The map information for autonomous driving 12 includes control information for autonomous driving of the vehicle. Meanwhile, regarding an updating period, an updating period of the map information for navigation 11 and that of the map information for autonomous driving 12 may be different throughout the period, or, may be different for a portion of the period while corresponding to each other for other portions of the period.

Figure 2:
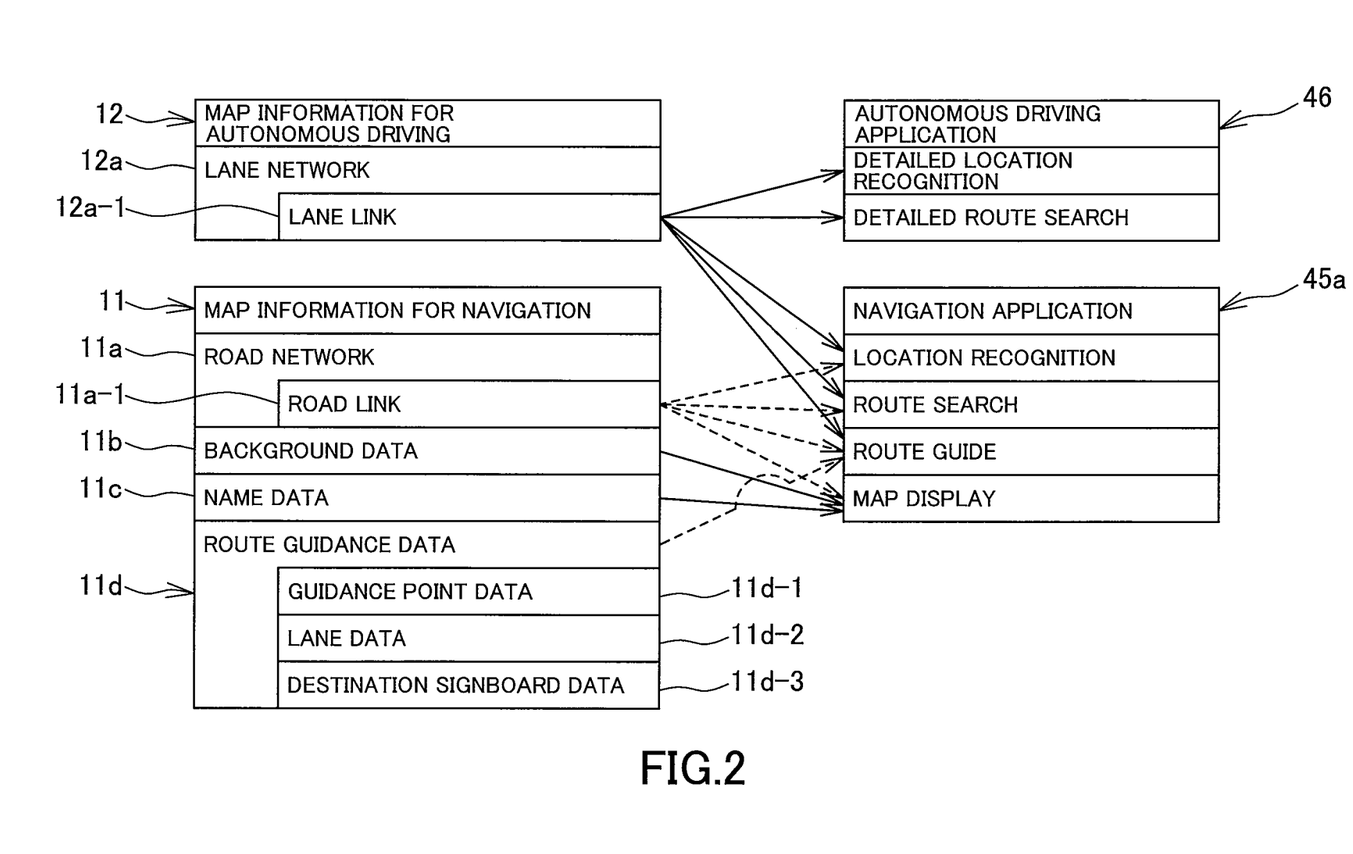
FIG. 2 is one example of a schematic diagram illustrating map information for navigation and map information for autonomous driving shown in FIG. 1.

FIG. 2 is one example of a schematic diagram illustrating map information for navigation and map information for autonomous driving shown in FIG. 1.

The map information for navigation 11 includes a road network 11a, background data 11b, name data 11c, and route guidance data 11d, or the like. The road network 11a is information which shows a road configuration in the map information by a road link 11a-1 which is a road divided at a predetermined section. Information such as a road width, the number of lanes, or the like is given as attribute information to each road link 11a-1. The background data 11b is information which shows buildings, facilities or the like in the vicinity of the road. The name data 11c is information which shows names of the roads, buildings or facilities in the vicinity thereof, or the like. The route guidance data 11d is information which is provided at a time of driving guidance and includes guidance point data 11d-1, lane data 11d-2, and destination signboard data 11d-3. The guidance point data 11d-1 is information which shows a point on a map at which information of turning right or turning left at an intersection or the like is to be provided, and a to-be-provided content provided at that point. The lane data 11d-2 is information which shows a traveling direction of a lane or the like on a road with an arrow or the like. The destination signboard data 11d-3 is information which simulated a road signboard which shows a direction such as, for example, to Nagoya, to Tokyo, or the like with an arrow, a name of a place, or the like.

The map information for navigation 11 is referred to by an application program for navigation (hereinafter referred to as a navigation application) 45a which builds each function of a guidance unit 45 shown in FIG. 1. The navigation application 45a performs a location recognition of a vehicle on the road network 11a with reference to the road network 11a and a location of the vehicle. Further, the navigation application 45a searches for the most appropriate guidance route from the location of the vehicle and a destination using the road network 11a. Further, regarding a predetermined area around the location of the vehicle, the map information for navigation 11 is visualized and displayed, and the route guidance along the searched guidance route is performed. In this route guidance, various image information shown by the lane data 11d-2 and the destination signboard data 11d-3 regarding a road on which a vehicle is running is overlaid on the map information for navigation 11 and displayed. Further, when the location of the vehicle approaches to a location shown by the guidance point data 11d-1, the to-be-provided content shown by the guidance point data 11d-1 is provided to a driver by an image or voice.

The map information for autonomous driving 12 includes a lane network 12a. The lane network 12a is an example of control information used in autonomous driving which shows a road configuration in detail by a lane link 12a-1 which is a lane on a road divided at a predetermined section.

The map information for autonomous driving 12 is referred to by an application program for autonomous driving (hereinafter referred to as an autonomous driving application) 46 which performs drive control for autonomous driving of a vehicle. The autonomous driving application 46 performs a detailed location recognition of a vehicle by the lanes on the road network 12a with reference to the road network 12a and a location of the vehicle. Further, by using the road network 12a, the autonomous driving application 46 searches for a detailed traveling route including a lane change from the location of the vehicle and the destination, or one point on the guidance route calculated by the map information for navigation 11.

In the navigation system 1 shown in FIG. 1, such map information for navigation 11 and map information for autonomous driving 12 are stored in the storage unit 10. In addition, the updating unit for navigation 20 updates the map information for navigation 11 at a certain update interval such as, for example, every half year or the like. When updated information by a maker of the map information for navigation 11 is obtained in a server on a network to which this navigation system 1 is connected, update of the map information for navigation 11 is performed according to an instruction from the server. On the other hand, the updating unit for autonomous driving 30 is updated according to an instruction from the server based on, for example, information of road construction or the like collected in the above-mentioned server in a short span such as one month. Thus, the map information for autonomous driving 12 is updated in a shorter span compared to the map information for navigation 11 which is updated in a long span as described above, since high consistency with an actual road environment is demanded by a nature of being used for autonomous driving.

The map information-providing unit 40 shown in FIG. 1 performs driving guidance while providing map information by combining the map information for autonomous driving 12 with the map information for navigation 11 in a case where the map information for autonomous driving 12 had been updated based on newer information than the map information for navigation 11 at a time of performing driving guidance. Further, the map information-providing unit 40 is made to perform driving guidance using the map information for autonomous driving 12. Further, the map information-providing unit 40 is configured to perform driving guidance using the map information for autonomous driving 12 in a case where the map information for autonomous driving 12 is updated based on newer information than the map information for navigation 11 at a time of performing driving guidance and the map information for autonomous driving 12 is judged to be necessary for driving guidance. The map information-providing unit 40 includes an update judging unit 41, a necessary/unnecessary judging unit 42, a map display data-creating unit 43, a synthesizing unit 44, and a guidance unit 45.

The update judging unit 41 judges whether the map information for autonomous driving 12 was updated based on the newer information than the map information for navigation 11 at a time of performing the driving guidance or not. The necessary/unnecessary judging unit 42 judges whether a content of updated information in the map information for autonomous driving 12 is included in the guidance route in driving guidance, and in addition, whether the content has an influence on the driving guidance such as a change in a connection status of a road or a big change in the shape of the road or the like. Based on these judgements, the necessary/unnecessary judging unit 42 judges whether a content of the map information for autonomous driving 12 is necessary or not for driving guidance. The map display data-creating unit 43 creates display data for map for autonomous driving in which control information in the map information for autonomous driving 12 is visualized regarding the predetermined area around the location of a vehicle.

The synthesizing unit 44 combines a non-inclusion object which is not included in the display data for map for autonomous driving 12 out of image objects in the map information for navigation 11 with the display data for map for autonomous driving, and creates display data for synthetic map. Further, in the present example, in a case where the non-inclusion object interferes the image object constituting the display data for map for autonomous driving, the synthesizing unit 44 combines the non-inclusion object with differentiating it from the image object constituting the display data for map for autonomous driving.

The guidance unit 45 performs driving guidance according to a result of combining in the synthesizing unit 44. Further, in the present example, the guidance unit 45 is configured to perform driving guidance according to respective judgement results of the update judging unit 41 and the necessary/unnecessary judging unit 42. This guidance unit 45 includes a display unit 451, a route-searching unit 452, a switch judging unit 453, and a route-guiding unit 454.

The display unit 451 displays the above-mentioned map information for navigation 11 and the display data for synthetic map in a manner switchable to each other. The route-searching unit 452 performs a route-search using either of the map information for navigation 11 and the map information for autonomous driving 12, according to the respective judgement results of the update judging unit 41 and the necessary/unnecessary judging unit 42. The switch judging unit 453 makes the display unit 451 to display the display data for synthetic map in a case where a location of a vehicle is located within an updated area corresponding to updated information in the map information for autonomous driving 12, and makes the display unit 451 to display the map information for navigation 11 in a case where the vehicle is located outside the updated area. The route-guiding unit 454 performs route guidance according to the respective judgement results of the update judging unit 41 and the necessary/unnecessary judging unit 42 using the displayed information of the display unit 451.

Next, as an example of a map information-providing method of the present invention, a process performed by the above-mentioned navigation system 1 is described with reference to a flowchart below, although the description partly overlaps the description up to here.

Figure 3:
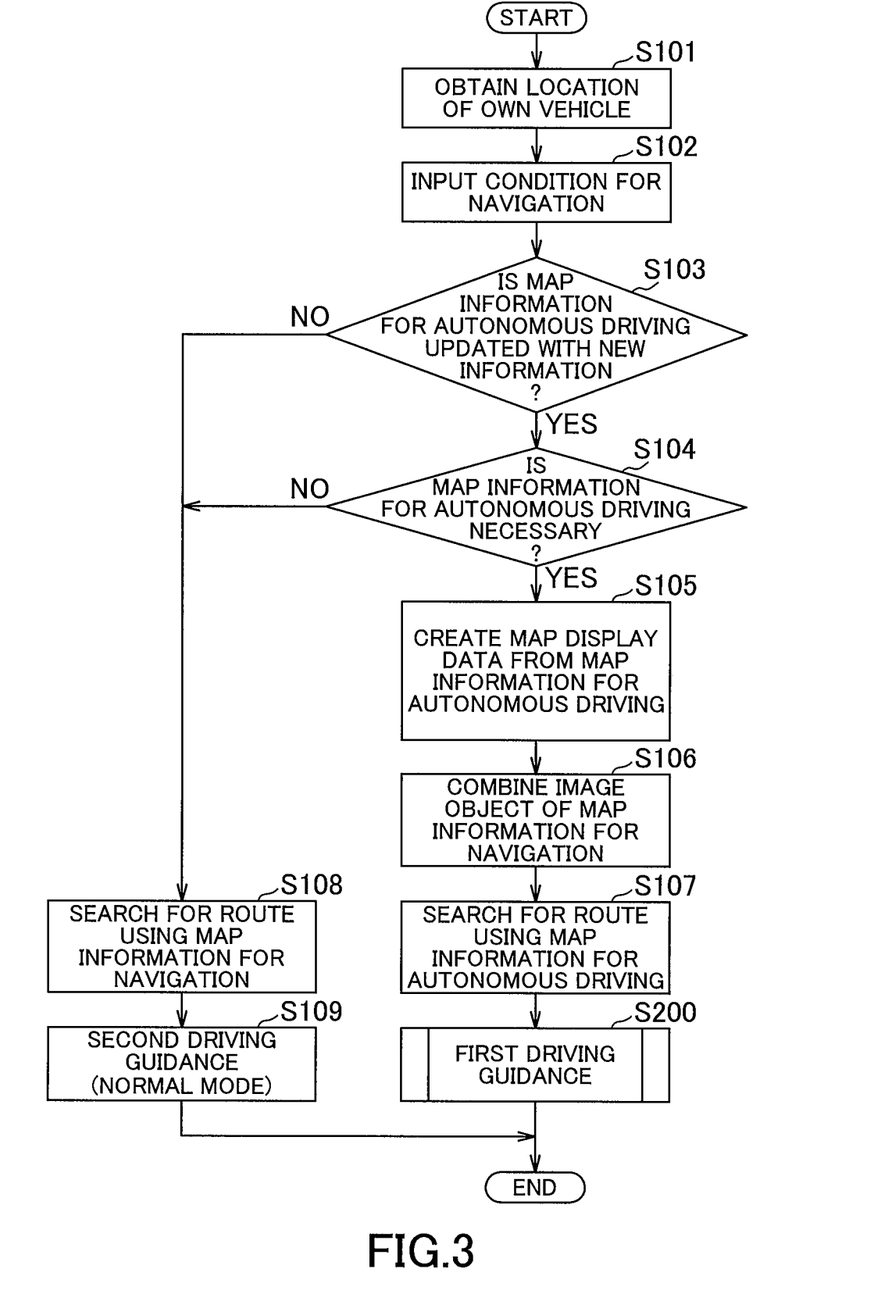
FIG. 3 is a flowchart showing a flow of a process performed in the navigation system shown in FIG. 1.

FIG. 3 is a flowchart showing a flow of a process performed by the navigation system shown in FIG. 1.

A process shown by this flowchart starts when electrical power of the navigation system 1 shown in FIG. 1 is turned on. When the process is started, first, a location of a vehicle is obtained for example by GPS (Global Positioning System) installed on the vehicle (step S101). Then, conditions of navigation are inputted by a driver via a predetermined input unit in the navigation system 1 (step S102). Here, a destination of a drive or the like is inputted.

Next, in an updating process which is performed at any time separately from the process shown in the flowchart of FIG. 3, whether the map information for autonomous driving 12 has been updated based on the newer information than the map information for navigation 11 or not is judged by the update judging unit 41 (step S103). In a case where the map information for autonomous driving 12 is updated based on new information (Judged Yes in step S103), whether the content of the map information for autonomous driving 12 is necessary or not for driving guidance is judged by the necessary/unnecessary judging unit 42 (step S104).

The judgement in step S104 is judged as follows by using a location of a vehicle obtained in step S101, a destination inputted as a navigation condition in step S102, and an updated content in the map information for autonomous driving 12.

First, as a premise of the judgement, it is assumed that the map information for navigation 11 is updated in a lump with respect to a wide area such as, for example, a nationwide basis or the like, whereas the map information for autonomous driving 12 is updated by a local area including a place where a road construction or the like was performed, or by a particular road such as an expressway or the like. Taking these conditions in consideration, as a judgement here, first, whether the content of updated information in the map information for autonomous driving 12 is included in a guidance route in driving guidance or not is judged. Meanwhile, the guidance route referred here does not mean a route which is searched by the route-searching unit 452 as mentioned later, but means a roughly assumed route assumed from a location of a vehicle obtained in step S101 and a destination inputted in step S102.

Specifically, a judgement on whether a content of updated information is included in the guidance route is performed as follows. That is, whether a location of a vehicle as a starting point of the assumed route, a destination as an end point, or at least one point of predetermined points on the assumed route is included in the updated area or a particular road or not is judged. The particular road here means a road such as an expressway, an arterial road, or the like which is assumed to be set as a route of autonomous driving.

In addition, whether the content of updated information in the map information for autonomous driving 12 is a content which influences driving guidance such as a change in a connection status of a road, a big change in the shape of a road, or the like or not is also judged. Thus, in the present invention, whether the content of updated information in the map information for autonomous driving 12 is included in the guidance route in the driving guidance and the content is a substantial change which influences the driving guidance or not is judged. In step S104, by such a judgement, whether the content of the map information for autonomous driving is necessary for driving guidance or not is judged.

As a result of such a judgement, when the content of the map information for autonomous driving 12 is judged necessary (Judged Yes in step S104), the map display data-creating unit 43 creates the display data for map for autonomous driving from the map information for autonomous driving 12 (step S105). Subsequently, the synthesizing unit 44 creates the display data for synthetic map by extracting the above-mentioned non-inclusion object out of image objects in the map information for navigation 11 and combining the non-inclusion object with the display data for map for autonomous driving (step S106).

Figure 4:
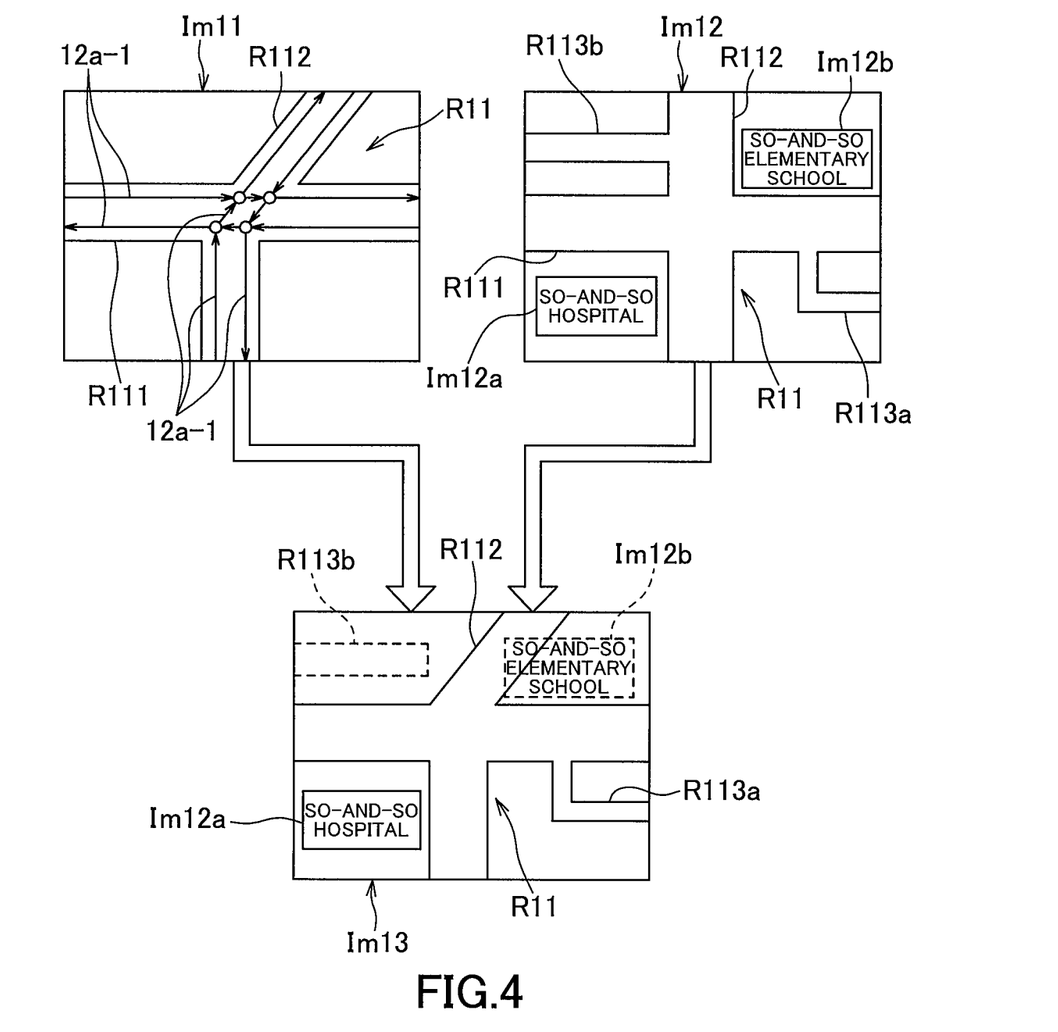
FIG. 4 is a schematic diagram showing a state where display data for synthetic map is created from map information for autonomous driving and map information for navigation.
Figure 5:
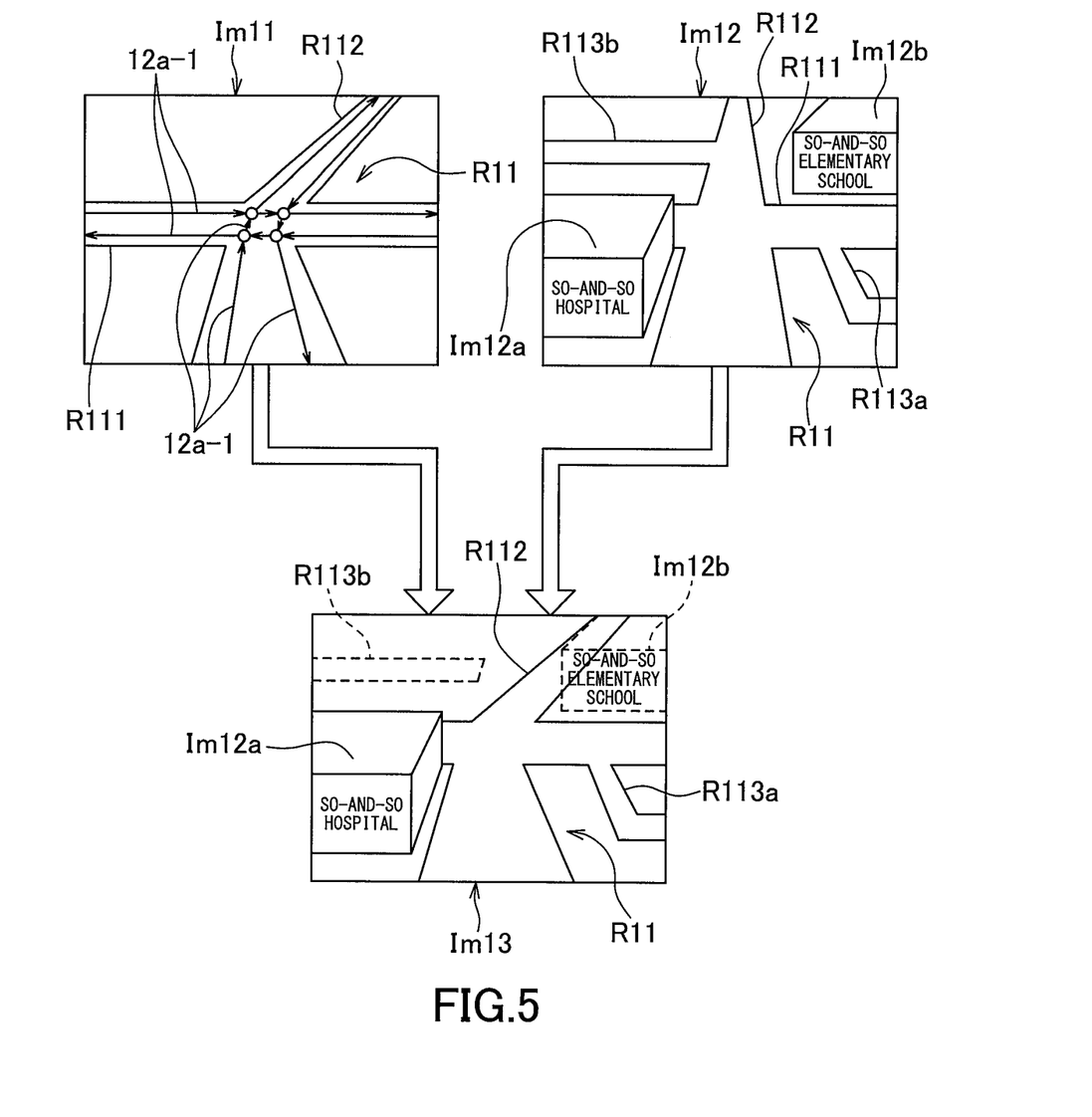
FIG. 5 is a schematic diagram in which a display format is switched to a three-dimensional display for each map image in the schematic diagram shown in FIG. 4.

FIG. 4 is a schematic diagram showing a state where the display data for synthetic map is created from the map information for autonomous driving and map information for navigation. Further, FIG. 5 is a schematic diagram in which a display format is switched to three-dimensional display regarding each map image in the schematic diagram shown in FIG. 4.

In FIG. 4, an image displayed by the display data for map for autonomous driving (hereinafter referred to as a map image for autonomous driving Im11) is shown on an upper left side, and an image displayed by the map information for navigation 11 (hereinafter referred to as a map image for navigation Im12) is shown on an upper right side. Further, an image displayed by the display data for synthetic map which is obtained by combining (hereinafter referred to as a synthetic map image Im13) is shown in a lower part of FIG. 4. Similarly, in FIG. 5 also, the map image for autonomous driving Im11 is displayed in a three-dimensional format on an upper left side, the map image for navigation Im12 is displayed in the three-dimensional format on the upper right side, and the synthetic map image Im23 is displayed in the three-dimensional format in the lower part.

First, creation of the display data for map for autonomous driving and display of the map image for autonomous driving Im11 are described. As described above, in the map information for autonomous driving 12, a road configuration is illustrated in detail by the lanes by the lane link 12*a*-1. The map display data-creating unit 43 in FIG. 1 creates the display data for map for autonomous driving to visualize a road to allow a driver to see the road easily by bundling the lane links 12*a*-1 in the map information for autonomous driving 12 by the roads. This image displayed by the display data for map for autonomous driving is the map image for autonomous driving Im11.

In the example here, crossroads R11 is shown at a center in both of the map image for autonomous driving Im11 and the map image for navigation Im12. In addition, in the map image for autonomous driving Im11, an upper-side upward direction road R112 located on an upper side of a transverse direction road R111 in the diagram is updated to a route which extends obliquely to an upper right side.

Here, in the present example, autonomous driving is performed with respect to a major road, for example, an expressway, an arterial road, or the like. Therefore, the map information for autonomous driving 12 is created with respect only to these main roads. On the other hand, the map information for navigation 11 is created with respect to basically all roads. In the example in FIGS. 4 and 5, only the crossroads R11 which are major roads are shown in the map image for autonomous driving Im11 based on the map information for autonomous driving 12. In contrast, two narrow streets R113*a* and R113*b* other than the crossroads R11 are also shown in the map image for navigation Im12 based on the map information for navigation 11.

Further, various data regarding a background of surroundings of the road which is not necessary to autonomous driving is not included in the map information for autonomous driving 12, and in the example of FIGS. 4 and 5, only the above-mentioned crossroads R11 are shown in the map image for autonomous driving Im11. In contrast, as explained referring to FIG. 2, background data 11*b* and name data 11*c* are included in the map information for navigation 11. In the example of FIGS. 4 and 5, an image object Im12*a* of "so-and-so hospital" is displayed in a lower left side region in the diagram out of regions partitioned by the crossroads R11, and an image object Im12*b* of "so-and-so elementary school" is displayed in an upper right side region in the diagram.

However, in the map image for navigation Im12 based on the map information for navigation 11 an updating timing thereof was a long time ago compared to the map information for autonomous driving 12, the upper-side upward direction road R112 is not updated and extends straight in an up-down direction.

Further, in the example here, the synthesizing unit 44 shown in FIG. 1 extracts a next image object as the non-inclusion object from the map information for navigation 11. That is, the synthesizing unit 44 extracts the two narrow streets R113*a* and R113*b*, the image object Im12*a* of "so-and-so hospital", and the image object Im12*b* of "so-and-so elementary school" that are not included in the map image for autonomous driving Im11 as the non-inclusion objects. Then, the synthesizing unit 44 combines these non-inclusion objects to the display data for map for autonomous driving and obtains the display data for synthetic map image to display the synthetic map image Im13.

Here, in the example of FIGS. 4 and 5, the image object Im12*b* of "so-and-so elementary school" interferes with the updated upper-side upward direction road R112 in the map image for autonomous driving Im11. Further, the narrow street R113*b* on the upper left side in the diagram out of the narrow streets R113*a* and R113*b* connected to the upper-side upward direction road R112 before updating is separated from the updated upper-side upward direction road R112. In the present example, the synthesizing unit 44 combines these image objects which do not conform to the updated map image for autonomous driving Im11 with differentiating them from other image objects. A differentiating format is not particularly limited, however, for example, it may include a format which displays the image object as a paler image than other image objects, or a format which displays the image object in a different display color from other image objects, or the like.

The synthetic map image Im13 is obtained through the steps S105 and S106 of the flowchart of FIG. 3 as explained above, and then the route-searching unit 452 shown in FIG. 1 performs the route search to a destination using the map information for autonomous driving 12 (step S107). Then, the guidance unit 45 performs a later-described first driving guidance based on the synthetic map image Im13 obtained in step S106 and a search result in step S107 (step S200).

Meanwhile, in a case where the map information for autonomous driving 12 is not updated based on the newer information than the map information for navigation 11 (Judged No in step S103), a normal route search is performed using the map information for navigation 11 (step S108). Further, in a case where it is judged that the map information for autonomous driving 12 is unnecessary also (Judged No in step S104), a normal route search in step S108 is performed. Then, following the normal route search, second driving guidance which is normal driving guidance using the map information for navigation 11 is performed (step S109). Since the second driving guidance in step S109 is a conventional process performed in a general navigation system, an explanation thereof is omitted, and below, the first driving guidance performed in step S200 is explained.

Figure 6:
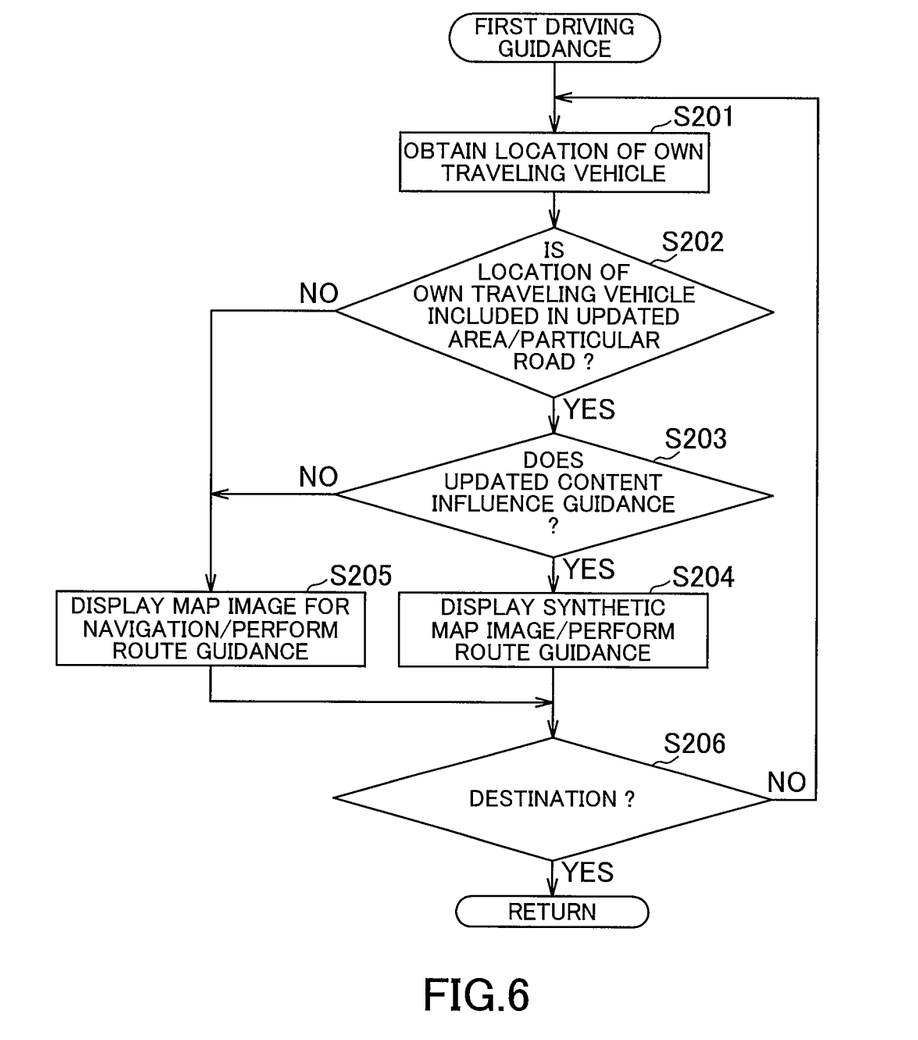
FIG. 6 is a flowchart showing a flow of a process in a first driving guidance shown in FIG. 3.

FIG. 6 is a flowchart showing a flow of a process in the first driving guidance shown in FIG. 3.

After the first driving guidance is started, firstly, a location of a traveling vehicle is obtained (step S201). Then, whether the obtained location is included in the updated area or the particular road corresponding to the updated information in the map information for autonomous driving 12 or not is judged (step S202). In a case where the location of the vehicle is included in the updated area or the particular road (Judged Yes in step S202), whether the updated content in the map information for autonomous driving 12 influences the driving guidance is further judged.

In a case where the updated content influences the driving guidance (Judged Yes in step S203), the switch judging unit 453 in FIG. 1 makes the display unit 451 to display the synthetic map image Im13 obtained in step S106 in FIG. 3 (step S204). Then, the route-guiding unit 454 in FIG. 1 performs the route guidance using the map information for autonomous driving 12 in step S204. In this route guidance, the guidance route which has been searched using the map information for autonomous driving 12 is displayed with a thick line or the like with respect to the synthetic map image Im13.

On the other hand, in a case where it is judged that a location of a vehicle is outside the updated area in step S202 (Judged No in S202), or in a case where it is judged that the updated content does not have an influence on driving guidance in step S203 (Judged No in S203), a following process is performed. That is, in these cases, the switch judging unit 453 in FIG. 1 makes the display unit 451 to display the map image for navigation Im12 based on the map information for navigation 11 (step S205). Then, the route-guiding unit 454 in FIG. 1 performs the route guidance using the map information for navigation 11 in step S205.

Meanwhile, different from the present example, the process in steps S202 to S205 may be a process which judges whether the obtained location is a location from which a vehicle is assumed to be located in the updated area after a certain time or not and performs switching of images according to the judgement result.

Following the process in step S204 or the process in step S205, whether a vehicle has reached a destination or not is judged (step S206). In a case where the vehicle has not reached the destination (Judged No in S206), the process returns to S201, and the processes thereafter are repeated. When the vehicle reaches the destination (Judged Yes in S206), the process returns to the flowchart of FIG. 3 and the first driving guidance (step S200) is terminated. With termination of the first driving guidance in step S200 or the second driving guidance in step S109, a series of processes the flowchart of the FIG. 3 shows is terminated.

Figure 7:
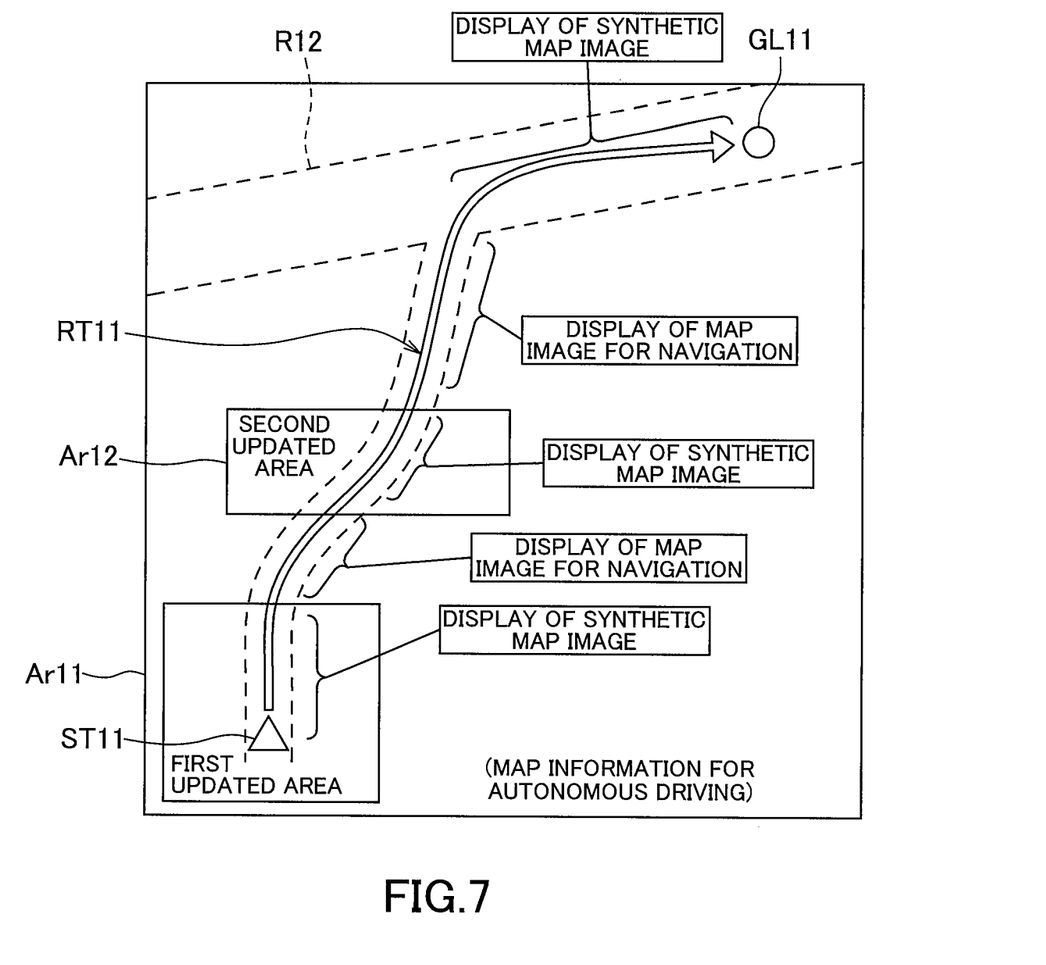
FIG. 7 is a diagram schematically showing a state where the first driving guidance is performed according to a flowchart of FIG. 6.

FIG. 7 is a diagram schematically showing a state where the first driving guidance is performed according to the flowchart of FIG. 6.

In an example of the FIG. 7, information of first and second updated areas Ar11 and Ar12 and a particular road R12 is updated in the map information for autonomous driving 12. A starting point ST11 of driving guidance, a destination GL11, and a searched guidance route RT11 are illustrated in FIG. 7. In the example here, the starting point ST11 and a half way through the guidance route RT11 overlap the first and the second updated areas Ar11 and Ar12 respectively, and a final portion of the route to the destination overlaps the particular road R12.

In a case where driving guidance is performed along the flowchart of FIG. 6 in this example, first, from a start of the guidance, the synthetic map image Im13 is displayed until a location of the vehicle gets out of the first updated area Ar11. Then, when the location of the vehicle gets out of the first updated area Ar11, the displayed map image is switched to the map image for navigation Im12. Next, when the location of the vehicle goes into the second updated area Ar12, the map image is switched to the synthetic map image Im13, and when the location of the vehicle gets out of the second updated area Ar12, the map image is switched to the map image for navigation Im12 again. Thereafter, until the location of the vehicle goes into the particular road R12, the map image for navigation Im12 is displayed, and when the location of the vehicle goes into the particular road R12, the map image is switched to the synthetic map image Im13, and thereafter, the synthetic map image Im13 will be kept displayed until the vehicle reaches the destination.

The navigation system 1 in the present example is constituted of a computer. A map information-providing program is stored in the computer to cause the computer to execute the map information-providing method shown by the flowcharts of FIGS. 3 and 6. The computer operates according to the map information-providing program, thereby building the navigation system 1 shown in FIG. 1.

In the navigation system 1 in the present example explained above, the map information for navigation 11 (first map information) and the map information for autonomous driving 12 (second map information) updating periods thereof are different from each other are stored in the storage unit 10. In addition, the map information-providing unit 40 provides map information by combining the map information for navigation 11 with the map information for autonomous driving 12 in a case where the map information for autonomous driving 12 had been updated based on the newer information than the map information for navigation 11 at a time of providing the map information to a driver by an image display or the like. That is, even when discrepancy is generated between an actual road environment and the map information for navigation 11, the map information is provided based on the map information for autonomous driving 12 which has high consistency with the actual road environment compared to the map information for navigation 11. Then, under such a circumstance, the map information can be provided by complementing a shortage of information in the map information for autonomous driving 12 with the other map information for navigation 11. Thus, according to the navigation system 1 of the present example, the map information can be provided while suppressing incongruity the driver as a recipient feels.

Here, according to the navigation system 1 of the present example, in the map information for autonomous driving 12 which is not intended to be referred to by a driver, information regarding the image object such as a building in the vicinity of a road or the like is not included. According to the navigation system 1 of the present example, such a non-inclusion object is extracted from the map information for navigation 11 and combined with the map information for autonomous driving 12. Consequently, driving guidance can be performed while further suppressing the incongruity the driver feels.

Further, since the non-inclusion object the synthesizing unit 44 combines with the display data for map for autonomous driving is based on the map information for navigation 11, there is a possibility that the information is old compared to the display data for map for autonomous driving. Therefore, when the non-inclusion object is combined with the display data for map for autonomous driving, there may be a case where the non-inclusion object interferes with the image object constituting the display data for map for autonomous driving. According to the navigation system 1 of the present example, in such a case, the synthesizing unit 44 combines the non-inclusion object with differentiating it from the image object constituting the display data for map for autonomous driving. By combining the non-inclusion object with differentiating it from the image object constituting the display data for map for autonomous driving, the visual incongruity caused by the interference can be suppressed, and moreover, it is possible to notify the driver there is a possibility that the non-inclusion object is different from an actual state. Thus, according to the navigation system 1 of the present example, driving guidance can be performed while further suppressing incongruity a driver feels.

Further, in the navigation system 1 of the present example, a use of the map information for autonomous driving 12 (second map information) is limited to a case where the map information for autonomous driving 12 is necessary for driving guidance. Consequently, for example, in a case where an updated content in the map information for autonomous driving 12 is substantially irrelevant to providing map information, an operation such as using the map information for navigation 11 (first map information) without performing a process which increases a burden such as switching map information becomes possible. Thus, according to the navigation system 1 of the present example, since it is possible to inhibit discrepancy between the actual road environment and the map information while inhibiting an increase of a burden of processing, map information can be provided while suppressing the incongruity the driver feels. Then, according to the navigation system 1 of the present example, since it is possible to suppress the incongruity between the actual road environment and the map information while utilizing image information for the driver in the map information for navigation 11, driving guidance can be performed while suppressing the incongruity the driver feels.

Further, according to the navigation system 1 of the present example, whether the map information for autonomous driving 12 is necessary or unnecessary is judged from comparison between the guidance route and the updated information in the map information for autonomous driving 12. Consequently, while efficiently inhibiting discrepancy between driving guidance and the actual road environment, the use of the map information for autonomous driving 12, which tends to be in shortage of information for the driver compared to the map information for navigation 11, can be minimized.

Further, according to the navigation system 1 of the present example, in displaying an image based on map information in driving guidance, the map image for navigation Im12 and the synthetic map image Im13 according to combined map information based on the display data for map for autonomous driving are appropriately switched and displayed. The map image for navigation Im12 is a map image easy to see for the driver, and the synthetic map image Im13 is a map image which has high consistency with the actual road environment. In driving guidance, by displaying these two kinds of map images separately according to a location of a vehicle, driving guidance can be performed while further suppressing incongruity a driver feels.

The present invention is not limited to the example explained above, but the invention includes other configurations which can achieve the object of the present invention, and the following modifications are also included in the present invention.

For example, in the above-mentioned example, as one example of the map information-providing system of the present invention, the navigation system 1 is exemplary shown in FIG. 1. However, the map information-providing system of the present invention is not limited to this. The map information-providing system of the present invention may be a system which provides map information on the network such as, for example, Google Maps (registered trademark). The map information-providing system of the present invention may be a system that, for example, appropriately obtains and stores other fresh map information together with main map information in the system, combines the other map information with the main map information and provides the combined map information.

Further, in the above-mentioned example, as one example of the map information-providing system of the present invention, the navigation system 1 in which all the elements shown in FIG. 1 are mounted in a vehicle is exemplified. However, the map information-providing system of the present invention is not limited to this. The map information-providing system of the present invention may be a system in which a portion of the elements thereof is mounted in a vehicle, and the rest of the elements is configured on the network and wirelessly connected to the elements on the vehicle side. In this case, the map information-providing program is made to be executed by a computer mounted in a vehicle and a computer on the network. Or, the map information-providing system of the present invention may be a system in which, for example, only the display unit is mounted on the vehicle, and all of the rest of the elements is configured on the network and wirelessly connected to the display unit on the vehicle side. In this case, the map information-providing program is executed by a computer on the network except a portion related to the display.

Further, in the example mentioned above, as one example of the map information-providing unit of the present invention, the navigation system 1 which combines a road which is located separate from an updated road in an as-separated state as shown in FIG. 4 when creating the display data for synthetic map image is exemplified. However, the map information-providing system of the present invention is not limited to this, and the map information-providing system may be a system which performs the combining such that the road as the one described above is extended to the updated road.

Further, in the above-mentioned example, as an example of the map information-providing system, the navigation system 1 which combines the image object which becomes apart from, interferes with, or is arranged in the vicinity of the updated road with differentiating it from other objects is exemplified. However, the navigation system of the present invention is not limited to this, and the navigation system may be a system which performs combining without using, i.e., without displaying, the image object as the one described above.

Further, in the above-mentioned example, as an example of the map information-providing system, the navigation system 1 which judges whether the map information for autonomous driving 12 is necessary or unnecessary, and provides map information by combining the map information for navigation 11 with the map information for autonomous driving 12 only when it is necessary is exemplified. However, the navigation system of the present invention is not limited to this. The map information-providing system of the present invention may be a system which does not judge whether the map information for autonomous driving 12 is necessary or unnecessary. That is, the map information-providing system may be a system such as the one which provides map information by always combining the map information for navigation 11 with the map information for autonomous driving 12 in a case where the map information for autonomous driving 12 is updated based on newer information than the map information for navigation 11.

Further, in the above-mentioned example, as one example of the map information-providing system of the present invention, the navigation system 1 which switches, when providing map information, the synthetic map image Im13 based on the map information for autonomous driving 12 and the map image for navigation Im12 according to a location of a vehicle is exemplified. However, the navigation system of the present invention is not limited to this. The navigation system of the present invention may be a system such as the one which displays the synthetic map image Im13 all the time in a case where the map information for autonomous driving 12 is judged necessary for driving guidance.

REFERENCE SIGNS LIST 1 navigation system (map information-providing system)
10 storage unit
11 map information for navigation (first map information)
11a road network
11a-1 road link
11b background data
11c name data
11d route guidance data
11d-1 guidance point data
11d-2 lane data
11d-3 destination signboard data
12 map information for autonomous driving (second map information)
12a lane network
12a-1 lane link
20 updating unit for navigation
30 updating unit for autonomous driving
40 map information-providing unit
41 update judging unit
42 necessary/unnecessary judging unit
43 map display data-creating unit
44 synthesizing unit
45 guidance unit
45a navigation application
46 autonomous driving application
451 display unit
452 route-searching unit
453 switch judging unit
454 route-guiding unit
Ar11 first updated area
Ar12 second updated area
GL11 destination
Im11 map image for autonomous driving Im12 map image for navigation
Im12a, Im12b image object (non-inclusion object)
Im13 synthetic map image
R11 crossroads
R12 particular road
R111 transverse direction road
R112 upper-side upward direction road
R113a, R113b narrow street (non-inclusion object)
RT11 guidance route
ST11 starting point

The invention claimed is:

1. A map information-providing system comprising:
a memory storage storing first map information, and second map information updating period thereof is different from the first map information with respect to at least a portion of a period of time; and
a processor configured to display, to a driver of a vehicle, a map information image created by combining the second map information, that is visualized, with the first map information in a case where the second map information has been updated based on newer information than the first map information at a time of providing the map information,
wherein the first map information is map information for navigation having image information for providing driving guidance, via displaying, to the driver of the vehicle, and
wherein the second map information is map information for autonomous driving having control information for autonomous driving of the vehicle and not having image information for driving guidance, via displaying, to the driver of the vehicle,
wherein the processor is further configured to create display data for map for autonomous driving to visualize, as the map information image to be displayed to the driver, the control information in the map information for autonomous driving,
wherein the processor is further configured to combine a non-inclusion object that is not included in the display data for map for autonomous driving out of image objects in the map information for navigation with the display data for map for autonomous driving, and
wherein the processor is further configured to perform the driving guidance according to a result of the combining of the non-inclusion object with the display data for map for autonomous driving.

2. The map information-providing system according to claim 1, wherein the processor is further configured to finish combining without using the non-inclusion object, or to combine the non-inclusion object with differentiating it, using different display color or using lighter color, from the image object constituting the display data for map for autonomous driving in a case where the non-inclusion object interferes or is arranged in vicinity of an image object constituting the display data for map for autonomous driving.

3. A map information-providing method comprising:
an update judging step of judging whether second map information updating period thereof is different from first map information for at least a portion of a period of time has been updated based on newer information than the first map information at a time of providing map information or not; and
a map information-providing step displaying, to a driver of a vehicle, a map information image created by combining the second map information, that is visualized, with the first map information in a case where the second map information has been updated based on newer information than the first map information,
wherein the first map information is map information for navigation having image information for providing driving guidance, via displaying, to the driver of the vehicle,
wherein the second map information is map information for autonomous driving having control information for autonomous driving of the vehicle but not having image information for driving guidance, via displaying, to the driver of the vehicle, and
wherein the map information-providing step further includes:

creating display data for map for autonomous driving to visualize, as the map information image to be displayed to the driver, the control information in the map information for autonomous driving;

combining a non-inclusion object that is not included in the display data for map for autonomous driving out of image objects in the map information for navigation with the display data for map for autonomous driving; and performing the driving guidance according to a result of the combining of the non-inclusion object with the display data for map for autonomous driving.

4. A map information-providing program executed by a computer to perform the map information-providing method according to claim 3.

* * * * *